United States Patent
Swaine et al.

(10) Patent No.: US 7,229,007 B1
(45) Date of Patent: Jun. 12, 2007

(54) SELF-SERVICE TERMINAL

(75) Inventors: Stephen W. Swaine, Auchterarder (GB); Kenneth A. Nicoll, Birkhill (GB)

(73) Assignee: NCR Corporation, Dayton, OH (US)

( * ) Notice: Subject to any disclaimer, the term of this patent is extended or adjusted under 35 U.S.C. 154(b) by 815 days.

(21) Appl. No.: 09/710,342

(22) Filed: Nov. 9, 2000

(30) Foreign Application Priority Data

Dec. 3, 1999 (GB) .................................. 9928736.9

(51) Int. Cl.
*G07F 19/00* (2006.01)
*G06F 7/08* (2006.01)
*G06Q 40/00* (2006.01)

(52) U.S. Cl. .................. 235/379; 235/381; 705/43

(58) Field of Classification Search ............. 235/379, 235/380, 375, 381; 705/43; 902/8, 30
See application file for complete search history.

(56) References Cited

U.S. PATENT DOCUMENTS

| | | | |
|---|---|---|---|
| 4,314,352 A * | 2/1982 | Fought | 235/379 |
| 5,412,189 A | 5/1995 | Cragun | 235/379 |
| 5,589,855 A * | 12/1996 | Blumstein et al. | 235/379 |
| 5,705,798 A * | 1/1998 | Tarbox | 235/379 |
| 5,962,830 A * | 10/1999 | Wallace | 235/379 |
| 6,149,055 A * | 11/2000 | Gatto | 235/379 |
| 6,164,853 A * | 12/2000 | Foote | 400/472 |
| 2003/0058139 A1* | 3/2003 | Sakurai | 341/22 |

FOREIGN PATENT DOCUMENTS

| | | |
|---|---|---|
| EP | 0632413 | 1/1995 |
| EP | 0793204 | 9/1997 |
| GB | 1166085 | 10/1969 |
| GB | 2304449 | 3/1997 |
| JP | 1161151 | 9/1999 |

* cited by examiner

*Primary Examiner*—Michael G. Lee
*Assistant Examiner*—April Taylor
(74) *Attorney, Agent, or Firm*—Gregory A. Welte

(57) ABSTRACT

A self-service terminal (10) having a simplified user interface (20). The user interface (20) contains a plurality of indicators (28) for entering data, where each indicator (28) has a unique attribute, such as size, shape, color, surface texture, or the like. Each indicator is associated with a pre-defined transaction, so that a user may execute a desired transaction by selecting a single indicator (28). A method of executing a transaction is also described.

18 Claims, 3 Drawing Sheets

SELF-SERVICE TERMINAL

BACKGROUND OF THE INVENTION

The present invention relates to a self-service terminal (SST). In particular, the invention relates to an SST, such as an automated teller machine (ATM), having a simplified user interface.

ATM user interfaces generally have two sets of keys for inputting data. One set is referred to as a keypad and comprises typically sixteen keys, where each key displays a numeral (typically from "0" to "9"), a brief word (such as "Enter", "Cancel", or such like), or is left blank. The second set of keys is referred to as FDKs (function display keys) and typically consists of two columns of four identical keys. The columns are located on either side of a screen, and a leader line is provided between each key and a portion of the screen to align the key with any text displayed on that portion of the screen. During a transaction, the ATM may display transaction types or amounts as options on the screen for selecting using an appropriate FDK. The function associated with each FDK depends on the option displayed by the screen.

One problem with using an ATM is that conventional ATMs conventionally provide many different transaction options. To execute a desired transaction a user must navigate through a sequence of menu screens using the keypad or FDKs as appropriate. This increases the possibility of a user becoming confused and/or failing to navigate through the sequence of menu screens to execute a desired transaction.

Another problem with using an ATM is that most of the keys look very similar to someone who is partially-sighted or cognitively-impaired, which may make it more difficult for these people to use ATMs effectively.

A disadvantage associated with having an ATM that uses two sets of keys is the additional expense in providing these keys and in aligning the FDKs with a screen to avoid parallax problems (where text on a display only aligns with an FDK at a particular viewing angle).

SUMMARY OF THE INVENTION

It is an object of one or more embodiments of the present invention to obviate or mitigate one or more of the above disadvantages or other disadvantages associated with conventional SSTs.

According to a first aspect of the invention there is provided a self-service terminal having a user interface comprising a plurality of indicators for entering data characterized in that each indicator has a unique attribute, and each indicator may be associated with a pre-defined transaction, so that a user may execute a desired transaction by selecting a single indicator.

By virtue of this aspect of the invention dedicated indicators are provided on an SST, each indicator being operable to execute a specific transaction, so that a user only requires to make one selection to execute a complete transaction. This ensures that a user does not need to navigate through a sequence of menu screens to select a transaction.

Preferably, each indicator is permanently visible, so that a user can observe the indicators prior to using the SST. This feature has the advantage that a user can verify that an SST has a single selection transaction capability before using the SST. Alternatively, the indicators may be displayed only after a user has been identified. This feature may be used if the indicators are provided on a touch-sensitive screen.

Preferably, each indicator is three-dimensional, such as a push button, a key, or such like. Alternatively, each indicator may be two-dimensional, such as an image displayed on a touch-sensitive screen, or such like. The advantage of having a three-dimensional indicator is that a blind or partially-sighted person can locate the indicators more easily than if they are two-dimensional.

Preferably, each three-dimensional indicator is configured so that the indicator protrudes from a surface on which it is mounted. This configuration allows a blind or partially-sighted person to touch the sides and top surface of an indicator, thereby assisting the user to identify the indicator.

The unique attribute may be related to the size of the indicator, for example, one indicator may be very small, a second indicator may be larger than the first, a third indicator may be larger than the second, and so on, so that a user can distinguish between indicators by the size of each indicator.

The unique attribute may be related to the color of the indicator, for example, one indicator may be blue, another red, another green, another yellow, and such like.

The unique attribute may be related to the shape of the indicator, for example, one indicator may be star-shaped, another may be square, another may be round, and such like.

The unique attribute may be related to the surface texture and/or surface pattern of the indicator.

The unique attribute may be a combination of two or more of the above attributes, for example, a yellow star-shaped indicator, a blue square indicator, or such like.

The unique attribute may be related to some other recognizable difference between the indicators to allow a cognitively-impaired individual to discriminate readily between the different indicators.

The pre-defined transaction may be withdrawal of cash, printing a receipt, depositing cash, purchasing a money order, or such like.

In one embodiment, the pre-defined transaction may be programmed by a user; that is, the indicators may be user-configurable so that a user is able to associate each indicator with a desired transaction. In such an embodiment, each indicator may be associated with a different transaction for each user. For example, for one user a star-shaped key may be associated with withdrawing ten pounds; whereas, for another user, the same star-shaped key may be associated with printing a receipt.

In another embodiment, the pre-defined transaction may be programmed by the owner of the SST; that is, the indicators may be configured by the owner of the SST so that each indicator is associated with the same transaction regardless of the identity of the user. For example, a star-shaped key may be associated with withdrawing twenty pounds for every user of the SST.

In one embodiment, the unique attribute of each indicator may designate the type of transaction associated with that indicator. For example, an indicator that is associated with printing a receipt may include an image of a receipt; an indicator that is associated with withdrawing twenty pounds may include an image of a twenty pound note; and such like.

In another embodiment, the unique attribute of each indicator that is associated with withdrawing cash may include the amount of cash that is withdrawn by selecting that indicator. For example, an indicator for withdrawing ten pounds may include the text "£10" on the indicator.

These embodiments have particular advantages for cognitively-impaired individuals as they are provided with a visual indication of the type and/or value of the transaction associated with each indicator.

According to a second aspect of the invention there is provided a self-service terminal having a user interface comprising a plurality of indicators for entering data characterized in that each indicator is different to the other indicators, and each indicator may be associated with a pre-defined transaction, so that a user may execute a desired transaction by selecting only one indicator.

According to a third aspect of the invention there is provided a method of executing a transaction at a self-service terminal, the method characterized by the steps of: providing a plurality of indicators, each indicator having a unique attribute; associating a unique transaction with each indicator; and, in response to a selection of one of the indicators, executing a transaction associated with the selected indicator.

According to a fourth aspect of the invention there is provided a self-service terminal comprising a user-interface consisting essentially of a plurality of different indicators, an identifier, and a dispensing area.

The identifier may be in the form of a card reader with or without a PIN entry device, a biometrics unit, or some other device for identifying a user.

The dispensing area may comprise one or more slots for dispensing valuable media such as cash, tickets, vouchers, and such like.

By virtue of this aspect of the invention an SST is provided that is inexpensive because it may not require a display.

According to a fifth aspect of the invention there is provided a self-service terminal characterized in that the terminal includes a plurality of different indicators, each indicator being associated with a specific transaction, whereby a user can execute a desired transaction in a single operation by selecting one of the indicators.

According to a sixth aspect of the invention there is provided a self-service terminal including a plurality of indicators characterized in that each indicator is operable to execute a transaction as a result of a single selection, so that after a user is identified, each transaction consists of a single selection by a user.

BRIEF DESCRIPTION OF THE DRAWINGS

These and other aspects of the invention will be apparent from the following specific description, given by way of example, with reference to the accompanying drawings, in which.

DETAILED DESCRIPTION

Figure 1:
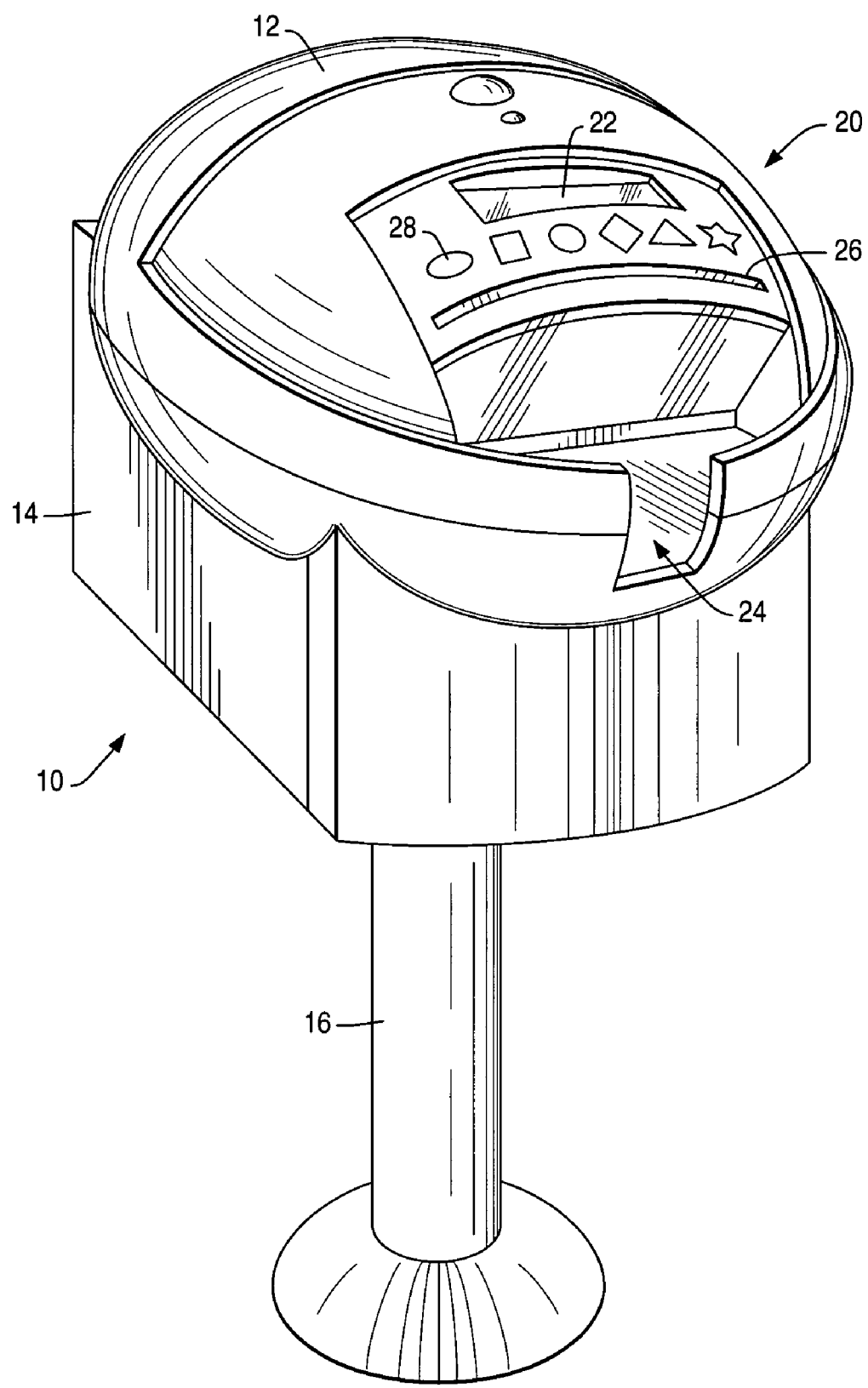
FIG. 1 is a perspective view of an SST in accordance with one embodiment of the present invention.
Figure 2:
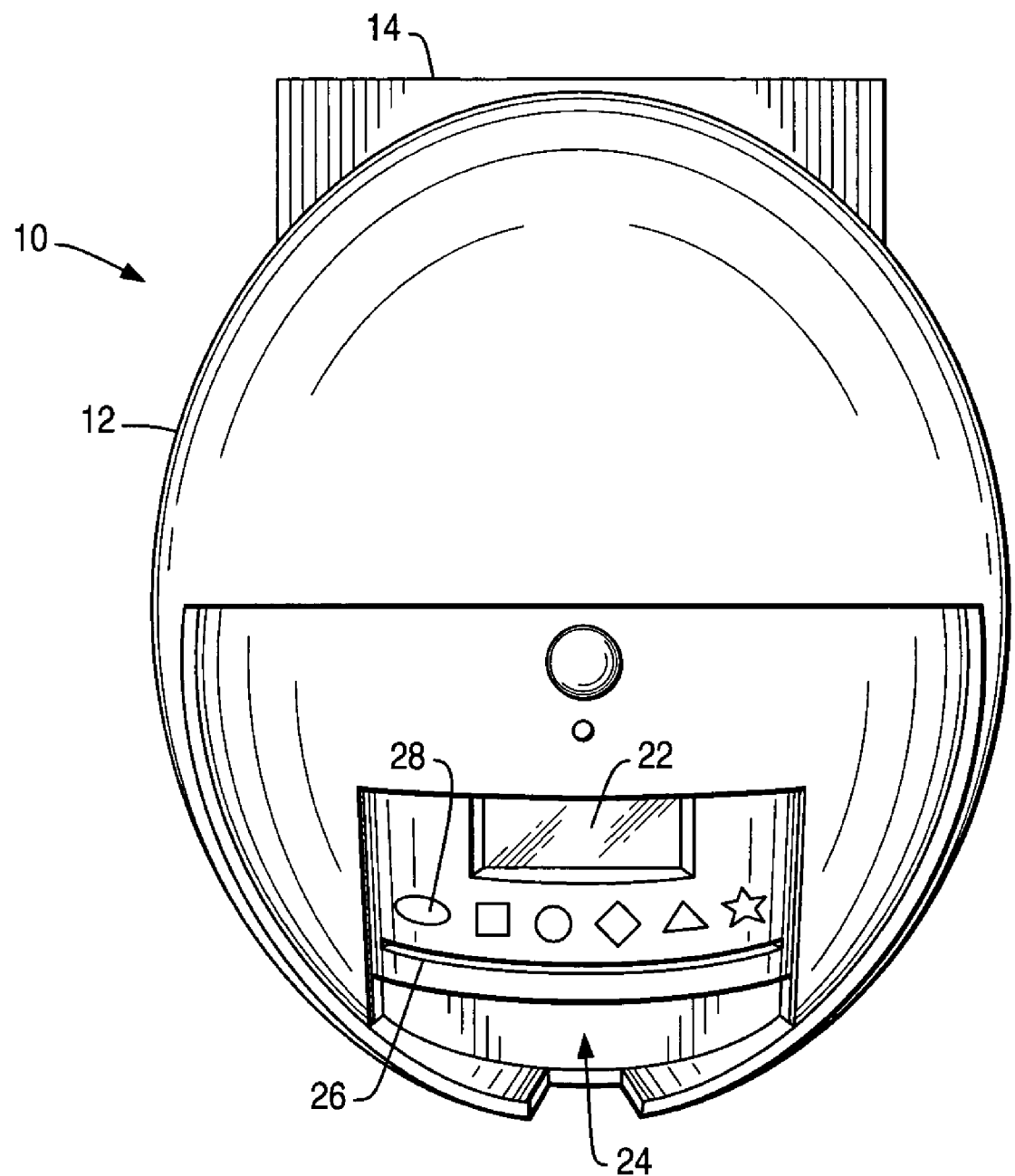
FIG. 2 is a plan view of the SST of FIG. 1.
Figure 3:
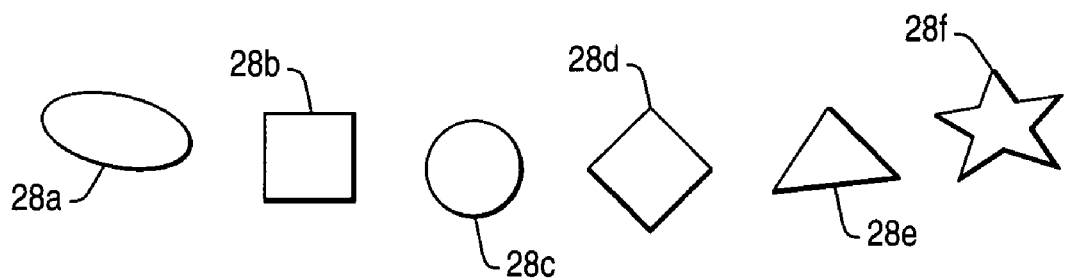
FIG. 3 is an enlarged view of the indicators of FIGS. 1 and 2.

Referring to FIGS. 1 to 3, an SST 10 in the form of an ATM has an egg-shaped body 12 mounted on a base 14 that is coupled to a stand 16. The ATM 10 includes a user interface 20. The user interface 20 comprises an LCD touch-sensitive display 22, a dispensing area 24 for dispensing cash to a user of the ATM 10, a swipe card reader slot 26, and six permanently-visible indicators 28a to 28f.

The six indicators 28 are in the form of six push buttons, each push button having a different shape, including an ellipse 28a, a square 28b, a circle 28c, a diamond 28d, a triangle 28e, and a star 28f.

Figure 4:
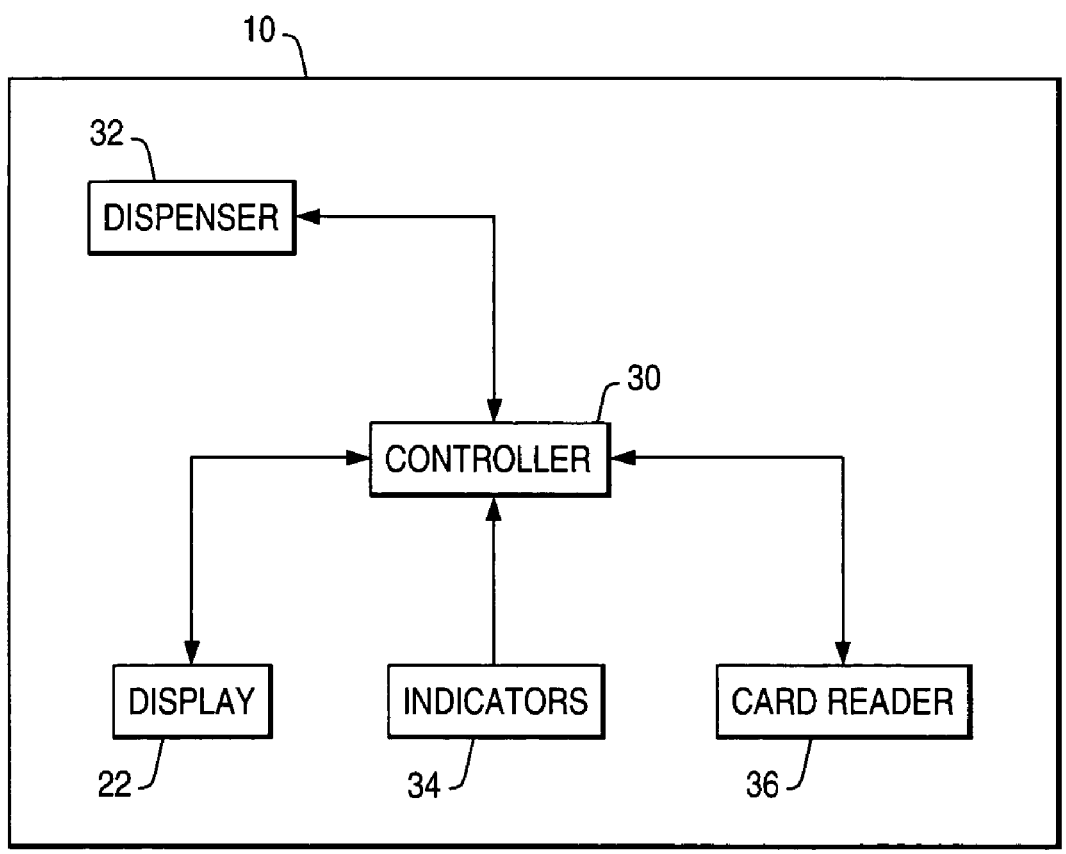
FIG. 4 is a block diagram of the SST of FIGS. 1 and 2.

Referring to FIG. 4, the ATM 10 has a controller 30 for controlling the operation of the ATM 10. The controller 30 is connected to a dispenser 32, the LCD display 22, an indicators module 34 that includes the push buttons 28, and a card reader module 36 that is located behind the card reader slot 26.

Each push button (for example, 28a) is associated with a pre-defined transaction. In this embodiment, the elliptical button 28a is associated with withdrawing ten pounds, the square button 28b is associated with withdrawing twenty pounds, the circular button 28c is associated with withdrawing thirty pounds, the diamond-shaped button 28d is associated with withdrawing forty pounds, the triangular button 28e is associated with withdrawing fifty pounds, and the star-shaped button 28f is associated with requesting a statement. The controller 30 is programmed with the pre-defined transactions.

To use the ATM 10, a user swipes his/her card through slot 26, enters his/her PIN using the LCD touch-sensitive display 22, and selects the push button 28 corresponding to the desired transaction, for example push button 28a for withdrawing ten pounds. On detecting push button 28a being depressed, the controller 30 instructs the dispenser 32 to dispense ten pounds to the dispense area 24 for collection by the user.

The ATM 10 may include some information (in the form of a label or presented on the display 22) to notify users about the type and/or value of the transaction associated with each push button.

It will be appreciated that this embodiment has the advantage that a user can execute a transaction by pressing one push button. Another advantage is that if a blind person is using the ATM, then the blind user can easily select a transaction because each push button has a different shape and the function of each push button is not determined by any text presented on the display 22.

Various modifications may be made to the above described embodiment within the scope of the invention, for example, in the above embodiment the unique attribute of each push button is the shape, in other embodiments the unique attribute may be color, texture, smell, or any other convenient characteristic for differentiating between push buttons. The indicators may be displayed on the display as touch-sensitive images. In other embodiments, a display may not be required. In other embodiments, the transaction associated with each indicator may be programmed by each user. In other embodiments, the ATM may have a cuboid shape rather than an egg shape. In other embodiments, the SST may be an information kiosk.

What is claimed is:

1. Apparatus, comprising:
   a) an Automated Teller Machine (ATM) which includes
      i) a touch-sensitive display;
      ii) a dispenser for dispensing cash to a user,
      iii) a card reader, and
   b) a plurality of N depressable push buttons
      i) all of which protrude from a surface of the ATM, near the touch-sensitive display,
      ii) all of which are three dimensional,
      iii) which are of N different shapes,
      iv) each of which executes a different one of N transactions when activated.

2. Apparatus according to claim 1, wherein the N buttons are effective to enable a blind person to select and execute one of the N transactions, without reference to any text on the display.

3. Apparatus according to claim 2, wherein the touch-sensitive display is effective to enable a sighted person to select and execute a transaction, with reference to text presented on the display.

4. Apparatus according to claim 1, wherein the buttons are distinguishable from each other by a blind person, based on shape.

5. Apparatus according to claim 1, and further comprising:
   c) configuration means for enabling a user to change the function executed by at least some buttons.

6. Apparatus according to claim 1, wherein at least one button performs a function A for a user U1, and a different function B for another user U2.

7. Apparatus according to claim 1, wherein the N different shapes include
   i) an elliptical shape,
   ii) a square shape,
   iii) a circular shape,
   iv) a diamond shape,
   v) a triangular shape, and
   vi) a five-pointed star shape.

8. Apparatus according to claim 1, further comprising:
   c) an indicator or text associated with each respective button, which describes a function which the button executes.

9. Apparatus according to claim 8, wherein
   i) for some users, at least one button performs a function described by its associated indicator or text, and
   ii) for other users, said button performs a different function, not described by the associated indicator or text of the button.

10. Apparatus, comprising:
    a) an ATM having no display;
    b) a plurality of depressable push buttons supported by and protruding through a surface of the ATM, wherein
       i) each depressable push button has a combination of specific size, specific shape, and specific texture, and
       ii) no two depressable push buttons have the same combination.

11. Apparatus according to claim 10, and further comprising:
    c) an indicator or text associated with each respective button, which describes a function which the button executes.

12. Apparatus according to claim 11, and further comprising control means which
    i) detects actuation of a selected button and
    ii) in response, executes the function indicated by the indicator or text associated with the selected button.

13. Apparatus according to claim 12, and further comprising:
    d) configuration means for enabling a user to change the function executed by each button.

14. Apparatus according to claim 10, wherein at least one button performs a function A for a user U1, and a different function B for another user U2.

15. Apparatus according to claim 10, wherein
    i) for some users, at least one button performs a function described by its associated indicator or text, and
    ii) for other users, said button performs a different function, not described by the associated indicator or text of the button.

16. Apparatus according to claim 10, wherein the buttons include
    i) a button of elliptical shape,
    ii) a button of square shape,
    iii) a button of circular shape,
    iv) a button of diamond shape,
    v) a button of triangular shape, and
    vi) a button of five-pointed star shape.

17. Automated Teller Machine, comprising:
    a) a row of depressable push buttons protruding through a surface of the ATM, all of different shapes;
    b) no display;
    c) a dispenser for dispensing cash to a user;
    d) a card reader for reading a passcard supplied by a user;
    e) control means for detecting a press of a button, and executing a function described by the label associated with the button; and
    f) configuration means for allowing a user to change the function executed by said button, so that said button performs different functions for different users.

18. An Automated Teller Machine, ATM, comprising:
    a) an interface in which every user-actuated depressable push button is a different combination of size, shape, and color, compared with all other buttons; and
    b) controller means for accepting instructions for
       i) allowing a first user to program a first set of buttons to perform a first set of functions, when later actuated by the first user; and
       ii) allowing a second user to program a second set of buttons to perform a second set of functions, different from the first set, when later actuated by the second user.

* * * * *